United States Patent
Yin et al.

(10) Patent No.: US 8,625,303 B2
(45) Date of Patent: *Jan. 7, 2014

(54) SERIAL ADVANCED TECHNOLOGY ATTACHMENT DUAL IN-LINE MEMORY MODULE ASSEMBLY

(75) Inventors: Xiao-Gang Yin, Shenzhen (CN); Guo-Yi Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 227 days.

This patent is subject to a terminal disclaimer.

(21) Appl. No.: 13/339,409

(22) Filed: Dec. 29, 2011

(65) Prior Publication Data

US 2013/0155637 A1   Jun. 20, 2013

(30) Foreign Application Priority Data

Dec. 15, 2011  (CN) .......................... 2011 1 0420537

(51) Int. Cl.
*H05K 1/11* (2006.01)
*H05K 5/00* (2006.01)

(52) U.S. Cl.
USPC ...... 361/803; 361/753; 361/791; 361/679.31; 439/62

(58) Field of Classification Search
USPC .................. 361/784–795; 439/62; 710/301
See application file for complete search history.

(56) References Cited

U.S. PATENT DOCUMENTS

| | | | |
|---|---|---|---|
| 5,611,057 A * | 3/1997 | Pecone et al. ................. | 710/301 |
| 6,004,139 A * | 12/1999 | Dramstad et al. ............... | 439/59 |
| 6,449,676 B1 * | 9/2002 | Johari et al. .................. | 710/304 |
| 6,491,526 B2 * | 12/2002 | Leman ........................... | 439/61 |
| 6,639,806 B1 * | 10/2003 | Chuang et al. ................. | 361/748 |
| 7,255,570 B1 * | 8/2007 | Feldman et al. ................ | 439/64 |
| 7,473,100 B2 * | 1/2009 | Moritake ....................... | 439/62 |
| 8,423,695 B2 * | 4/2013 | Purwin ......................... | 710/301 |
| 2002/0072255 A1 * | 6/2002 | Leman ........................... | 439/61 |
| 2002/0141170 A1 * | 10/2002 | Rhoads ......................... | 361/796 |
| 2003/0007339 A1 * | 1/2003 | Harris et al. ................. | 361/788 |
| 2006/0080473 A1 * | 4/2006 | Wang et al. .................... | 710/7 |
| 2006/0245119 A1 * | 11/2006 | Goodwin et al. ................ | 361/1 |
| 2008/0065805 A1 * | 3/2008 | Wu et al. ....................... | 710/301 |
| 2008/0094811 A1 * | 4/2008 | Hazelzet ....................... | 361/760 |
| 2009/0075494 A1 * | 3/2009 | Crighton ....................... | 439/62 |
| 2010/0128447 A1 * | 5/2010 | MacDougall et al. ........ | 361/737 |
| 2010/0241799 A1 * | 9/2010 | Schuette ....................... | 711/104 |
| 2011/0159718 A1 * | 6/2011 | McKee .......................... | 439/326 |
| 2012/0299582 A1 * | 11/2012 | Bai et al. .................... | 324/123 R |
| 2012/0320551 A1 * | 12/2012 | Sun ............................ | 361/785 |

(Continued)

*Primary Examiner* — Adrian S Wilson
*Assistant Examiner* — Abhishek Rathod
(74) *Attorney, Agent, or Firm* — Altis Law Group, Inc.

(57) ABSTRACT

A serial advanced technology attachment dual-in-line memory module (SATA DIMM) assembly includes a SATA DIMM module with a first circuit board, an expansion slot, and an expansion card with a second circuit board. A first edge connector is arranged on a bottom edge of the first circuit board and includes first power pins connected to a control chip and first storage chips, and first ground pins. A second edge connector is arranged on a top edge of the second circuit board and includes second power pins connected to a power unit, and second ground pins. A third edge connector is arranged on a bottom edge of the second circuit board and includes third power pins connected to the power unit, third ground pins, and signal pins connected to a display unit.

6 Claims, 2 Drawing Sheets

(56) References Cited

U.S. PATENT DOCUMENTS

| | | | |
|---|---|---|---|
| 2013/0038999 A1* | 2/2013 | Tian et al. | 361/679.41 |
| 2013/0070412 A1* | 3/2013 | Ge et al. | 361/679.32 |
| 2013/0073768 A1* | 3/2013 | Cong et al. | 710/301 |
| 2013/0094167 A1* | 4/2013 | Chen et al. | 361/791 |
| 2013/0100627 A1* | 4/2013 | Cong et al. | 361/785 |
| 2013/0114200 A1* | 5/2013 | Wu et al. | 361/679.31 |
| 2013/0151745 A1* | 6/2013 | Yin et al. | 710/301 |
| 2013/0155601 A1* | 6/2013 | Tian | 361/679.31 |
| 2013/0155637 A1* | 6/2013 | Yin et al. | 361/791 |
| 2013/0164952 A1* | 6/2013 | Wu et al. | 439/62 |
| 2013/0170128 A1* | 7/2013 | Liu et al. | 361/679.32 |

* cited by examiner

SERIAL ADVANCED TECHNOLOGY ATTACHMENT DUAL IN-LINE MEMORY MODULE ASSEMBLY

CROSS-REFERENCE OF RELATED APPLICATIONS

Relevant subject matter is disclosed in two co-pending U.S. patent application Ser. Nos. 13/339,407 and 13/339,412 filed on the same date, and respectively having titles of "SERIAL ADVANCED TECHNOLOGY ATTACHMENT DUAL IN-LINE MEMORY MODULE ASSEMBLY" and "DISPLAY CARD ASSEMBLY", which are assigned to the same assignee as this patent application.

BACKGROUND

1. Technical Field

The present disclosure relates to a serial advanced technology attachment dual in-line memory module (SATA DIMM) assembly.

2. Description of Related Art

Solid state drives (SSD) store data on chips instead of on magnetic or optical discs. One type of SSD has the form factor of a DIMM module and it is called a SATA DIMM module. The SATA DIMM module can be inserted into a memory slot of a motherboard, to add storage capacity. The problem is that the number of the storage chips arranged on the SATA DIMM module is limited and it is difficult to add additional storage capacity.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by way of limitation. References to "an" or "one" embodiment in this disclosure are not necessarily to the same embodiment, and such references mean at least one.

Figure 1:
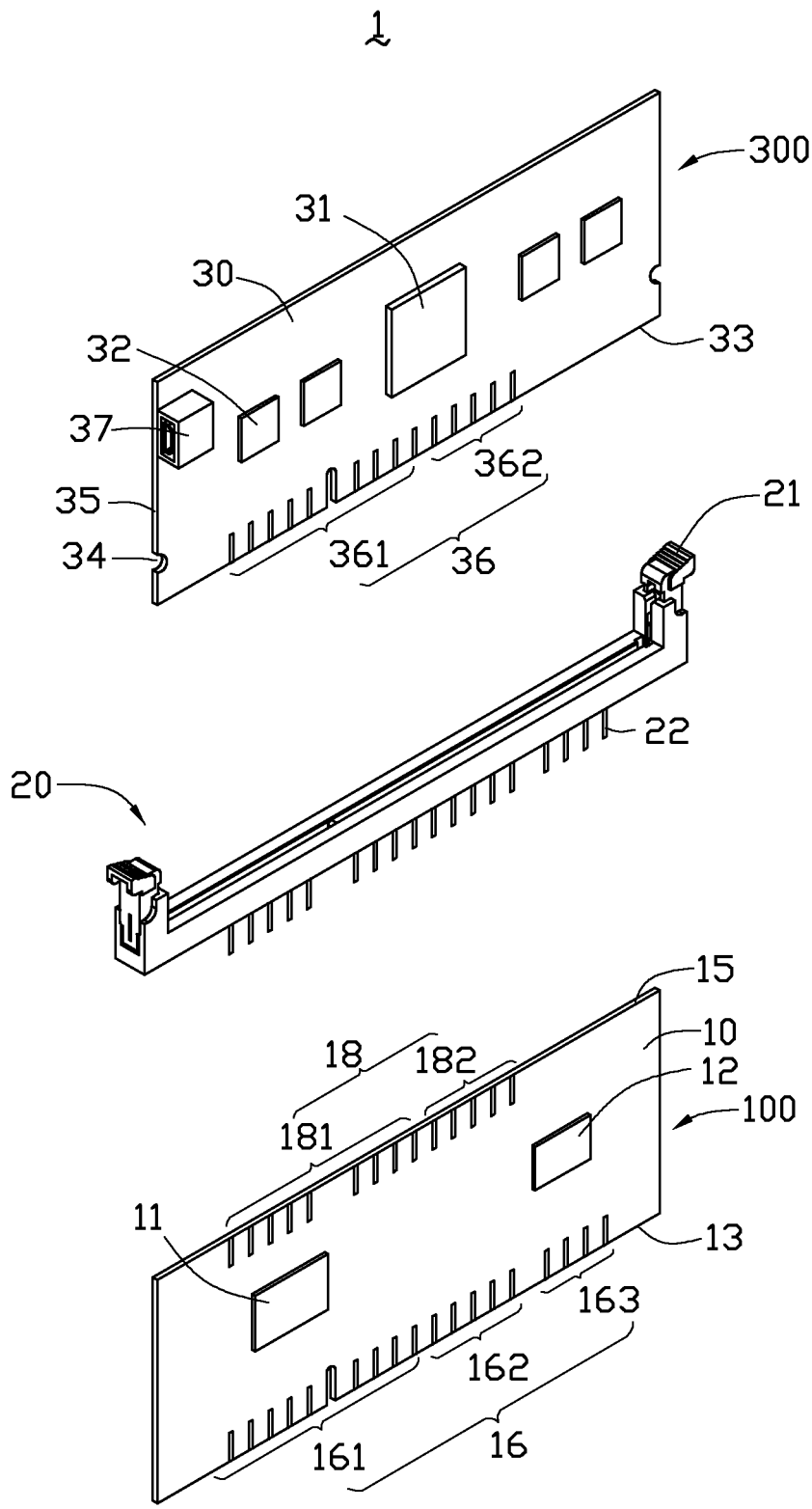
FIG. 1 is an exploded, isometric view of a serial advanced technology attachment dual in-line memory module (SATA DIMM) assembly in accordance with an exemplary embodiment.
Figure 2:
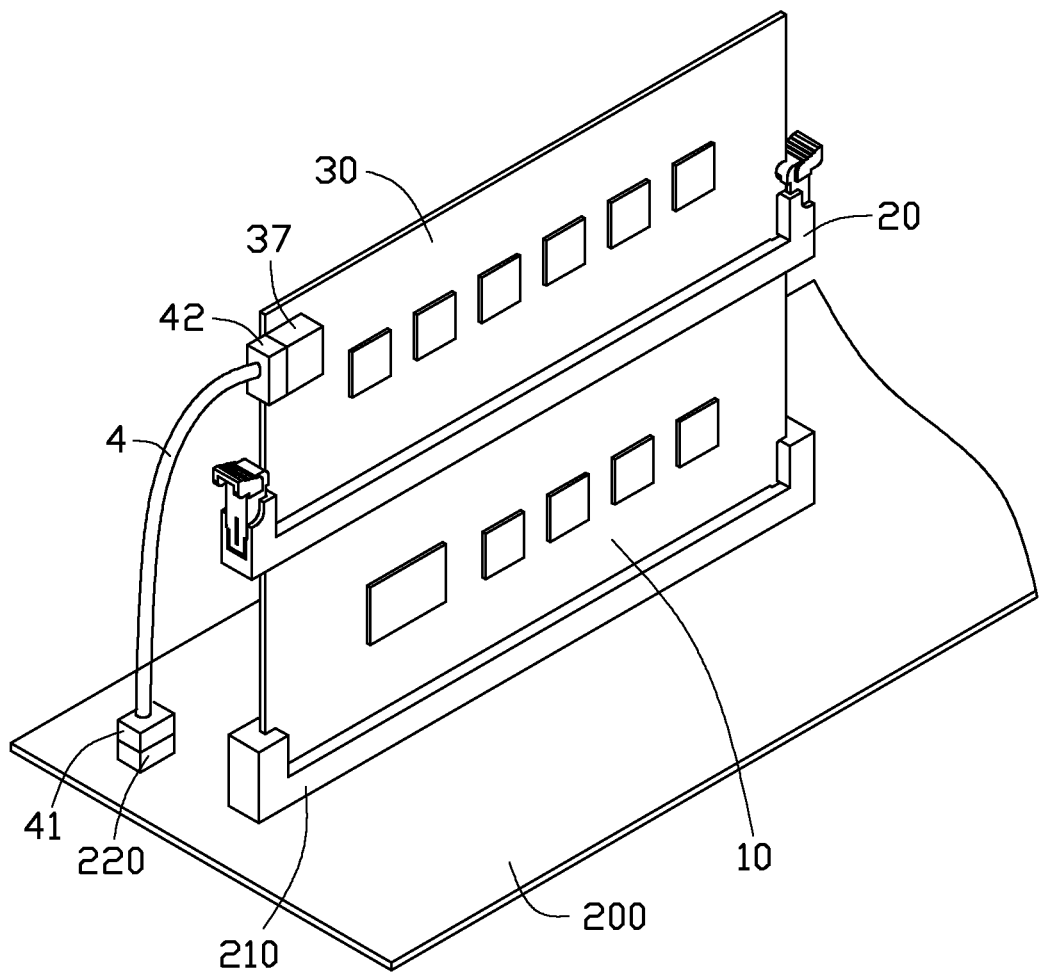
FIG. 2 is an assembled, isometric view of the SATA DIMM module assembly of FIG. 1 connected to a motherboard.

Referring to FIGS. 1 and 2, a serial advanced technology attachment dual in-line memory module (SATA DIMM) assembly 1 in accordance with an exemplary embodiment includes an expansion card 100, an expansion slot 20, and a SATA DIMM module 300. In one embodiment, the expansion card 100 is a peripheral component interconnection express (PCIe) card. The expansion slot 20 is a double data rate type three (DDR3) memory slot.

The expansion card 100 includes a substantially rectangular circuit board 10. A power unit 11 and a display unit 12 connected to the power unit 11 are both arranged on the circuit board 10. An edge connector 16 is arranged on a bottom edge 13 of the circuit board 10, to be inserted into an expansion slot such as a PCIe slot 210 of a motherboard 200. The edge connector 16 includes a plurality of power pins 161, a plurality of ground pins 162, and a plurality of signal pins 163. The power pins 161 are connected to the power unit 11. The ground pins 162 are connected to a ground layer (not shown) of the circuit board 10. The signal pins 163 are connected to the display unit 12. An edge connector 18 is arranged on a top edge 15 of the circuit board 10, to be electrically connected to pins 22 of the expansion slot 20. The edge connector 18 includes a plurality of power pins 181 and a plurality of ground pins 182. The power pins 181 are connected to the power unit 11. The ground pins 182 are connected to the ground layer of the circuit board 10.

The module 300 includes a substantially rectangular circuit board 30. A control chip 31, a plurality of storage chips 32, and a storage device interface 37 are all arranged on the circuit board 30. The storage device interface 37 is arranged on an upper left corner of the circuit board 30 and adjacent to an end 35 of the circuit board 30. The control chip 31 is connected to the storage device interface 37 and to the storage chips 32, to receive a control signal through the storage device interface 37 and control the storage chips 32 to store data according to the control signal. An edge connector 36 is arranged on a bottom edge 33 of the circuit board 30, to be inserted into the expansion slot 20 to connect the pins 22. The edge connector 36 includes a plurality of power pins 361 and a plurality of ground pins 362. The power pins 361 are connected to the control chip 31 and the storage chips 32. The ground pins 362 are connected to a ground layer (not shown) of the circuit board 30. Two grooves 34 are defined in two opposite ends 35 of the circuit board 30. In one embodiment, the storage device interface 37 is a SATA connector. In other embodiments, the storage device interface 37 may be an edge connector which accords with SATA standard, and includes a pair of signal input pins, a pair of signal output pins, and three ground pins.

In assembly, the edge connector 16 is inserted into the PCIe slot 210. When the motherboard 200 needs to add storage capacity, the edge connector 36 is inserted into the expansion slot 20. The pins 22 are soldered on the circuit board 10 to connect the edge connector 18. The power pins 361 and the ground pins 362 are respectively connected to the power pins 181 and the ground pins 182 through the pins 22. The fixing elements 21 are engaged in the grooves 34 of the module 300. The storage device interface 37 is connected to a storage device interface 220 of the motherboard 200 by a cable 4 with two storage device interfaces 41 and 42.

When the motherboard 200 receives power, the motherboard 200 outputs a voltage to the power unit 11 through the PCIe slot 210 and the power pins 161. The power unit 11 converts the received voltage, such as 5 volts (V), to 3.3V and outputs the 3.3V to the control chip 31 and the storage chips 32 through the power pins 181, the expansion slot 20, and the power pins 361. The motherboard 200 outputs a bus signal, such as a PCIe signal, to the display unit 12 through the PCIe slot 210 and the signal pins 163, to signal the expansion card 100. At the same time, the motherboard 200 outputs a control signal, such as a SATA signal, to the control chip 31 through the storage device interface 220, the cable 4, and the storage device interface 37, to control the storage chips 32 to store data.

The SATA DIMM module 100 can communicate with the motherboard 200 through the expansion card 100 and the expansion slot 20, to overcome a limited number of the memory slots of the motherboard 200.

Even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. A serial advanced technology attachment dual-in-line memory module (SATA DIMM) assembly, comprising:
   a first expansion slot;
   a SATA DIMM module comprising:
      a first circuit board comprising:
         a plurality of storage chips;
         a first storage device interface to be connected to a second storage device interface of a motherboard;
         a control chip connected to the storage chips and the first storage device interface, to receive a control signal through the first storage device interface and control the storage chips to store data according to the received control signal; and
         a first edge connector set on a bottom edge of the first circuit board and engaging in the first expansion slot, the first edge connector comprising a plurality of first power pins connected to the control chip and the first storage chips, and a plurality of first ground pins; and
   an expansion card comprising:
      a second circuit board comprising:
         a power unit;
         a display unit connected to the power unit;
         a second edge connector arranged on a top edge of the second circuit board and electrically connected to the first expansion slot, the second edge connector comprising a plurality of second power pins connected to the power unit, and a plurality of second ground pins; and
         a third edge connector arranged on a bottom edge of the second circuit board to engage in a second expansion slot of the motherboard, the third edge connector comprising a plurality of third power pins connected to the power unit, a plurality of third ground pins, and a plurality of signal pins connected to the display unit.

2. The SATA DIMM assembly of claim 1, wherein the second edge connector is soldered on the first expansion slot.

3. The SATA DIMM assembly of claim 1, wherein the first storage device interface is a SATA connector.

4. The SATA DIMM assembly of claim 1, wherein the first storage device interface is an edge connector and accords with SATA standard, and comprises a pair of signal input pins, a pair of signal output pins, and three ground pins.

5. The SATA DIMM assembly of claim 1, wherein the first circuit board is substantially rectangular, two grooves are defined in two opposite ends of the first circuit board, two fixing elements are arranged at two opposite ends of the first expansion slot, to engage in the grooves of the first circuit board.

6. The SATA DIMM assembly of claim 1, wherein the first expansion slot is a double data rate type three memory slot.

* * * * *